United States Patent [19]
Gumpoltsberger

[11] 3,884,098
[45] May 20, 1975

[54] PLANETARY GEAR

[75] Inventor: August Gumpoltsberger, Sonthofen, Germany

[73] Assignee: BHS-Bayerische Berg Hutten-und Salzwerke Aktiengesellschaft, Munich, Germany

[22] Filed: Mar. 13, 1973

[21] Appl. No.: 340,850

[30] Foreign Application Priority Data
Mar. 20, 1972 Germany............................ 2213487

[52] U.S. Cl.................... 74/801; 74/750 R; 74/606
[51] Int. Cl....... F16h 1/28; F16h 3/44; F16h 57/02
[58] Field of Search.......... 74/750 R, 801, 785, 606, 74/DIG. 7, DIG. 8

[56] References Cited
UNITED STATES PATENTS

| | | | |
|---|---|---|---|
| 2,591,743 | 4/1952 | Thompson | 74/801 |
| 2,724,266 | 11/1955 | Baker et al. | 74/801 X |
| 2,737,064 | 3/1956 | Stoeckicht | 74/801 X |
| 3,222,954 | 1/1965 | Wuertz | 74/801 |
| 3,347,341 | 10/1967 | Avrea | 74/606 X |
| 3,424,035 | 1/1969 | Heidrich | 74/801 |
| 3,434,374 | 3/1969 | Barwig et al. | 74/801 |
| 3,481,222 | 12/1969 | Baron | 74/750 R |
| 3,741,041 | 6/1973 | Boor | 74/801 |

FOREIGN PATENTS OR APPLICATIONS 1,922,417  11/1970  Germany .............................. 74/801

Primary Examiner—Samuel Scott
Assistant Examiner—Lance W. Chandler
Attorney, Agent, or Firm—Silverman & Cass, Ltd.

[57] ABSTRACT

A planetary gear for use on boats having solar wheels and planetary wheels arranged in a housing, wherein for purposes of inspection, access openings and engaging structures are provided in various parts of the assembly for lifting and moving same, enabling small and larger inspections.

2 Claims, 10 Drawing Figures

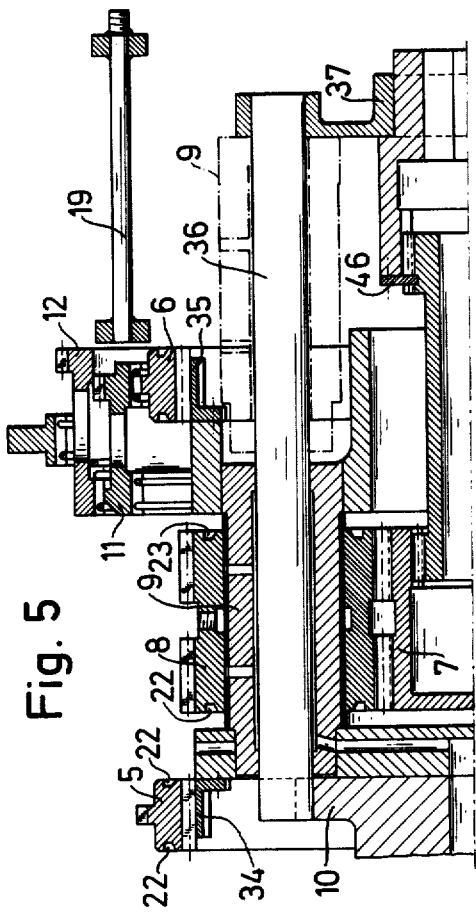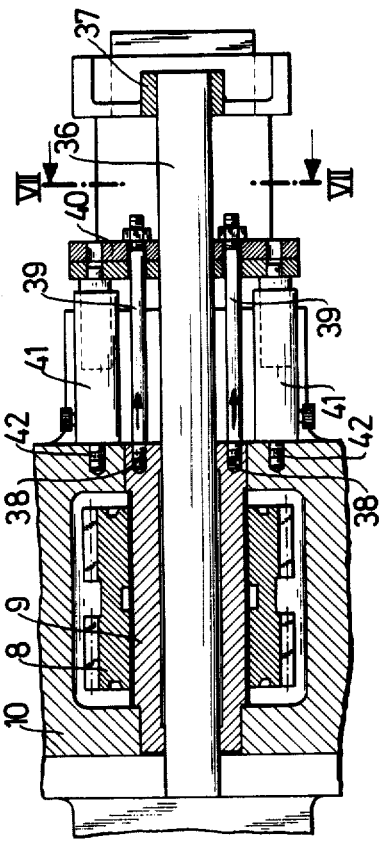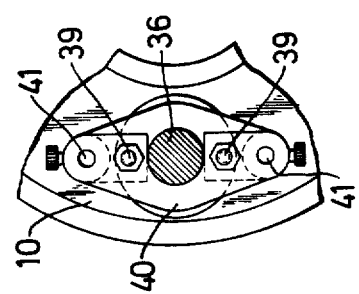

PLANETARY GEAR

The invention relates to a planetary gear, particularly a planetary gear for boats, comprising an outer and inner solar wheel arranged in a housing and planetary wheels supported in a planetary wheels carrier. These planetary wheels may be arranged on planetary wheel bolts or on their own bearings.

Planetary gears of this kind are already known from prior art, but due to their relatively complicated design and compact construction and the poor accessibility connected therewith they require a high expenditure in time and expenses when inspections must be carried out. However, on the other hand inspections are absolutely indispensable at definite intervals, in order to assure the operating efficiency of the planetary gear over prolonged periods. These inspections are particularly difficult in case of planetary gears for boats, because there the congested space conditions of the hull of the ship create additional problems. On the other hand, precisely in this area of application high operating safety is demanded so that these inspections must be performed by all means.

The object of the present invention is to design a planetary gear of the type mentioned initially in such a manner that these inspections can be carried out satisfactorily without major expenditures in time and auxiliary means.

According to the invention, this object is achieved by access openings at the housing, planetary supports and coupling sleeves leading to the wheel set, fastening means at the solar wheels, the planetary wheels, the planetary wheel bearings and the planetary wheel support, for engaging assembly members and by supporting the solar wheels, the planetary wheels and the planetary wheel bearings in dismantled position. This results in the advantage that both the so-called minor and the major inspections can be carried out with a small expenditure in time and auxiliary means. During these inspections the bottom part of the housing remains fixedly connected to the foundation. Neither is it necessary to separate the connections of the drive shaft to the motor and of the driven shaft to the driven equipment (the propeller shaft in boat gears). A renewed alignment is not necessary, which is another advantage.

According to another characteristic of the invention the fastening installations at the solar wheels and the planetary wheels are rotating grooves at the frontal surfaces for engagement of the lifting equipment. That way the lifting equipment can engage in a simple manner the parts involved and thereby expose the parts to be inspected.

According to another characteristic of the invention each planetary wheel bolt is designed as planetary wheel bearing in a hollow configuration, wherein mounting elements can be applied to one frontal surface. A sliding tubular support can be inserted into the hollow planetary wheel bolts and be supported on both sides, a mounting flange with traction apparatus being positioned on said support and connectable to the planetary wheel bolt. That way a planetary wheel bolt can be dismantled in a simple manner.

According to another characteristic of the invention the sliding tubular support bears down on the planetary wheel support on the one hand and on the flange of the drive side via a bearing on the other hand, so that only a slight expenditure is required in auxiliary means in order to carry out this portion of the inspection.

According to another characteristic of the invention the mounting flange can be connected to the planetary wheel bolt by means of traction bars. With the aid of these traction bars and the traction apparatus the planetary wheel bolt can be dismantled in each case in a simple manner.

The mounting flange is characterized furthermore according to the invention by the feature of being divided into two parts, which makes possible its placing on and removal from the sliding tubular support without the necessity of removing the bearings of the sliding tubular support.

According to another characteristic of the invention the traction apparatus comprises two hydraulic cylinders bearing down on the mounting flange and fastened to the planetary wheel support. This too substantially facilitates the mounting and dismounting respectively of the planetary wheel bolts for carrying out the inspection.

According to another characteristic of the invention the mounting flange can be connected via traction bars also with the planetary support and via two hydraulic cylinders with the planetary wheel bolt. This advantageously offers assurance after completion of the inspection that the planetary wheel bolt can be replaced in a simple manner for proper operation.

According to another characteristic of the invention a support can be screwed to at least one frontal surface of the planetary carrier for supporting the mounted outer solar wheel, thereby assuring inspection of the corresponding solar wheels.

According to another feature of the invention both coupling sleeves may be provided with access openings to the wheel set in a planetary gear whose outer solar wheels are connected to the housing via double serrated couplings, so that the lifting equipment can be inserted.

According to another feature of the invention the inner coupling sleeve of the double serrated coupling is secured on the one hand by an elastic ring and on the other hand on the housing side by an elastic ring with radially displaceable wedging member for tensioning this elastic ring axially in the outer coupling sleeve. This advantageous improvement assures a simple removal and replacement of the inner coupling sleeve.

According to another feature of the invention, a traction bar connectable to the planetary wheels and/or an endoscope or illuminating instrument can be inserted into the access openings (housing, coupling sleeves, planetary support) which is connected to a measuring or traction apparatus, so that the prevailing bearing play can be measured without any major effort and the serrations can be inspected.

SUMMARY OF THE INVENTION

A planetary gear assembly for use on boats comprising solar and planetary wheels, support members therefor, including access openings engaging elements and members for supporting the assembly parts in dismantled condition, enabling frequent inspection of critical portions of the assembly.

The invention is described below more in detail by means of an embodiment represented in the drawings, in which;

FIG. 5 shows a partial view of the gear according to FIG. 1, during the dismantling of a planetary wheel bolt;

FIG. 6 is a design view for FIG. 5 during the dismantling of a planetary wheel bolt;

FIG. 7 is a section along line VII—VII in FIG. 6;

Figure 1:
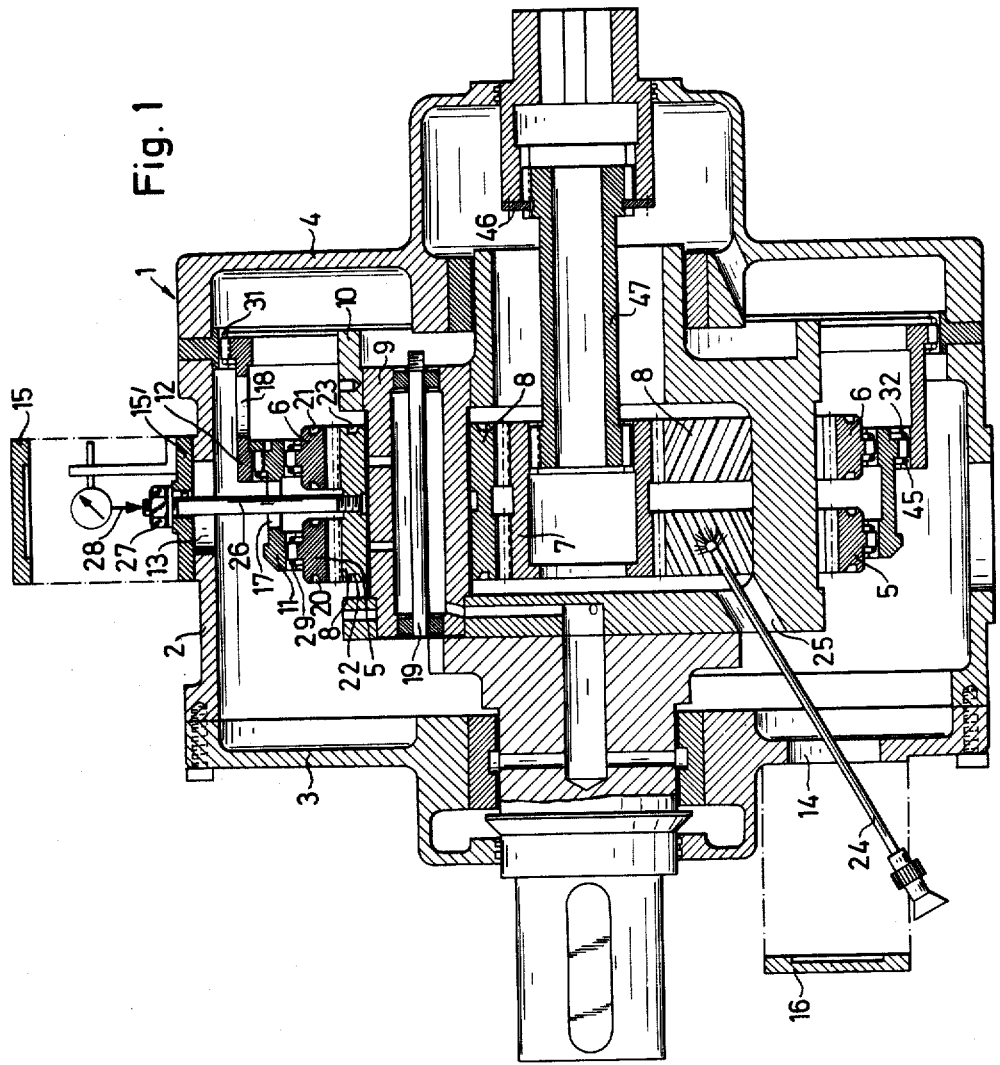
FIG. 1 shows a view of the planetary gear according to the invention, particularly of a planetary gear for boats, in section.

According to FIG. 1 the planetary gear substantially comprises the housing 1 with the upper housing part 2 and the sidewalls 3 and 4, the two part outer solar wheel 5 and 6, the inner solar wheel 7, a plurality of planetary wheels 8 arranged on planetary wheel bolts 9 in the planetary wheel support 10 and an inner coupling sleeve 11 and an outer coupling sleeve 12. According to the invention, access openings 13 are provided in the upper housing part 2, and access openings 14 are provided at the lateral walls 3 and 4 respectively. These access openings 14 may of course be located in the upper range of the sidewall 3 or 4. The access openings 13 and 14 are covered by peephole covers 15 and 16. The inner and outer coupling sleeves 11 and 12 have in each case an access opening 17 and 18.

A bilaterally sealing insert 19 is located within the planetary wheel bolt 9 which is of hollow desing. The outer solar wheels 5 and 6 have grooves 20, 21 on both of their frontal surfaces. The planetary wheels 8 have grooves 22 and 23, respectively.

In order to carry out a so-called minor inspection, it is possible to introduce after the removal of the peephole covers 15 and 16 according to FIG. 1, an endoscope or illumination instrument 24 at the access openings 13 and 14, provided with a control mirror, through perforations 25 in the planetary wheel support 10. The number of the perforations 25 depends on the number of units of planetary wheels. For better illustration, the endoscope or the illumination apparatus 24 is shown in the lower area of the sidewall 3. However, it is also possible to introduce these instruments via access openings and perforations in the upper area of the gear into the interior of the wheel set. By introducing instrument 24, it is now possible to inspect the supporting pattern of the rotary serration of the inner solar wheel 7 and of the planetary wheels 8. In order to carry out this inspection and to be able to inspect all tooth engagements at the circumference of the inner solar wheel and the planetary wheels, the planetary wheel support 10 is so rotated that the endoscope or illuminating instrument 24 can be inserted consecutively at all perforations 25 of the planetary wheel support 10. Another possibility for the inspection of the supporting pattern of the wheel set also consists of introducing a slender electrical rod-like light.

In order to determine the bearing play of the planetary wheels 8, the possibility exists, according to FIG. 1, of introducing a traction bar 26 through the access openings 13 into the interior of the housing 1 and to screw it to the prevailing planetary wheel 8. Now the traction bar 26 can be tightened via a screw 27, whereby the bearing play can be measured in a simple manner via a measuring apparatus 28, that is the bearing play of the planetary wheels 8.

Figure 2:
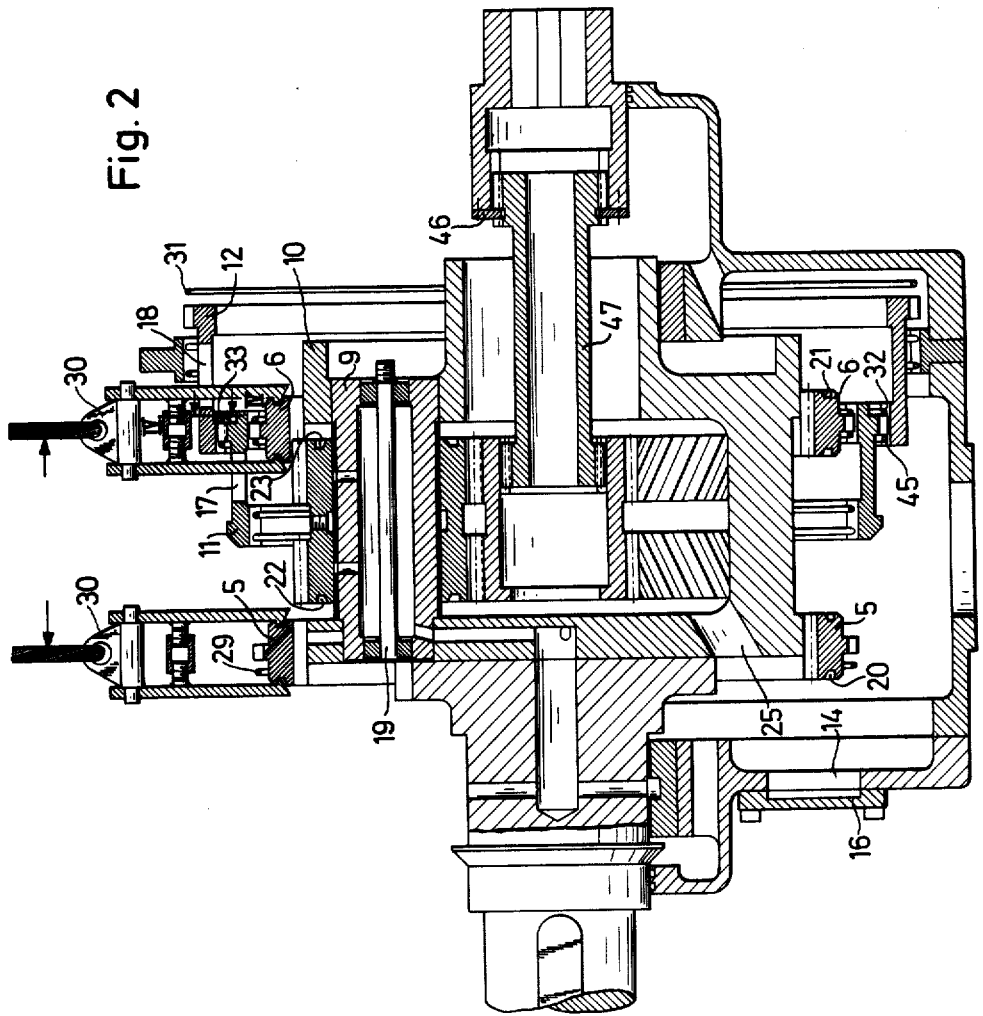
FIG. 2 shows the planetary gear according to FIG. 1 with the upper housing part removed and with the lifting equipment engaged into the outer solar wheels.

In order to carry out a so-called major inspection, it is necessary, according to FIG. 2, to first lift off the upper parts 2, 3 and 4 of the housing 1. An elastic ring 29 is to be removed from the corresponding annular groove and it can be deposited on the outer solar wheel 5. Subsequently the elastic ring 31 is to be removed.

Lifting equipment 30 is introduced through the openings 17, 18 and hooked with protrusions into the grooves of the outer solar wheel 6. A tension lock nut of the lifting apparatus 30 is tightened, whereupon the outer solar wheel 6 can be moved to the right with the coupling sleeves 11, 12, according to FIG. 12.

Figure 3:
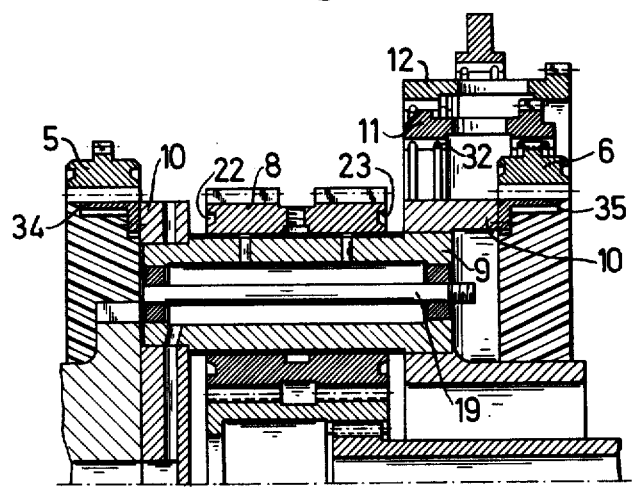
FIG. 3 shows part of the gear according to FIG. 1 with the solar wheels removed.
Figure 4:
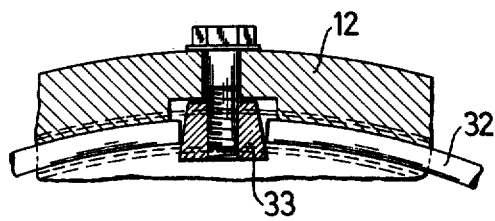
FIG. 4 shows a section along line IV—IV in FIG. 2.

Subsequently the lifting apparatus 30 is hooked with protrusions into the grooves 20 of the outer solar wheel 5 and shifted to the left following tightening of the tension lock nut. According to FIG. 4 an elastic ring 32 which is tensioned via a radially displaceable wedging member 33 is relaxed by loosening the screw of the wedge member 33, so that now, after taking out the elastic ring 32 the inner coupling sleeve 11 can be pushed into the outer coupling sleeve 12 (see FIG. 3). Thereby the planetary wheels 8 are exposed for inspection.

Prior to shifting the outer solar wheels 5 and 6, the supports 34 and 35 first must be screwed to the planetary wheel support 10 bilaterally at its frontal sides. Then the outer solar wheels 5 and 6 now can be positioned according to FIG. 3 on these narrow segment-like supports 34 and 35. By rotating the outer solar wheels 5 and 6, the supporting pattern of their inner serrations now can be inspected.

Figure 8:
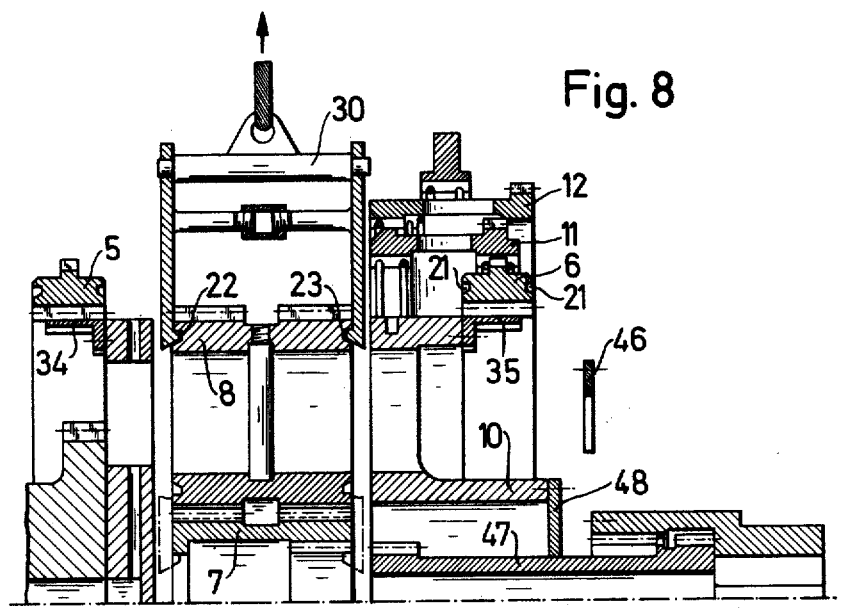
FIG. 8 is a partial view of the gear in section during the dismantling of the planetary wheels.

Now the lifting apparatus 30 can be hooked into the holding grooves 22 and 23 of the planetary wheel 8 (see also FIG. 8). By lifting the planetary wheel 8 until the adherence of the lower side of the planetary wheel perforation to the lower side of the planetary wheel bolt 9 the effective bearing play can be determined very precisely also in this manner.

In identical position of the outer solar wheels 5 and 6 and of the coupling sleeves 11 and 12 it is possible to dismantle the planetary wheels 8 in order to inspect the supporting picture of the planetary wheels 8 and of the inner solar wheel 7. Prior to removing the planetary wheel 8 by means of the lifting apparatus 30 the planetary wheel bolt 9 must be pulled according to FIGS. 5 to 7. The bolt 9 is pulled by first removing the insert 10 from the hollow planetary wheel bolt 9.

Sliding tubular supports 36 now are pulled into the bolts 9, said supports in turn bearing down on the one hand at the planetary wheel carrier 10 and on the other hand via a bearing 37 on the flange of the drive side. Two traction bars 39 (FIG. 6) are screwed into the planetary bolt 9 for removal in threaded holes 38 provided especially for this operation. The bolt 9 is then pulled hydraulically by two hydraulic cylinders 41 via a mounting flange 40 (direction of arrow II).

The hydraulic cylinders 41 are fastened to the planetary wheel support 10 and bear down on the mounting flange 40. Thus, according to FIG. 6 they press via the traction bars 39 the mounting flange 40 to the right, which results in the pulling of the planetary wheel bolt 9.

Following the pulling out from the firm seat in the planetary wheel support 10 the bolt 9 can be rotated on the sliding tubular support 36 and thus be inspected (shown in dots and dashes in FIG. 5). This requires removal of the complete traction apparatus without necessity of dismantling the bearings of the sliding tubular support 36. This condition is made possible by the mounting flange 40 comprising 2 parts of which in each case one part embraces the sliding tubular support 36 on half a side according to FIG. 7. If necessary, the planetary wheel bolt 9 can be exchanged following removal of the bearing 37.

At the same time the possibility now exists for removing the planetary wheel 8 which prior to pulling of the bolt 9 is suspended in the lifting apparatus 30 (see FIG. 8) following removal of the planetary wheel bolt 9 and the sliding tubular support 36. This offers the possibility of inspection of the inner solar wheel 7. This solar wheel 7, however also may be dismantled; to do so, the divided ring 46 (FIG. 1) is removed first. Then the coupling sleeve 47 can be shifted far enough to the right so that the lifting apparatus 30 engages into the inner solar wheel 7. The coupling sleeve 47 is thereby maintained by a supporting flange 48 which is screwed to the planetary support 10.

Figure 10:
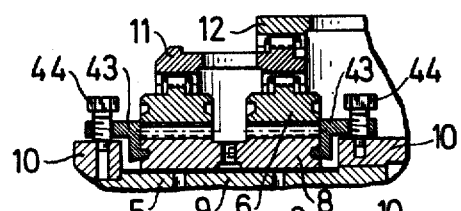
FIG. 10 shows a partial view of the gear according to FIG. 1 in section during the dismantling of a planetary wheel bolt.

According to FIG. 10 the possibility also exists of providing holding claws 43 in lieu of the lifting apparatus 30, said claws engaging into the grooves 22 and 23 of the planetary wheel 8. These holding claws 43 can be fastened to the planetary wheel carrier 10 via screws 44. The holding claws are advantageous, for example, when there is no lifting apparatus 30 or if the planetary gear is installed at a cramped location as to space.

Following the execution of the so-called major inspection the individual parts of the serration are reassembled in reversed sequence, using the same auxiliary means.

Figure 9:
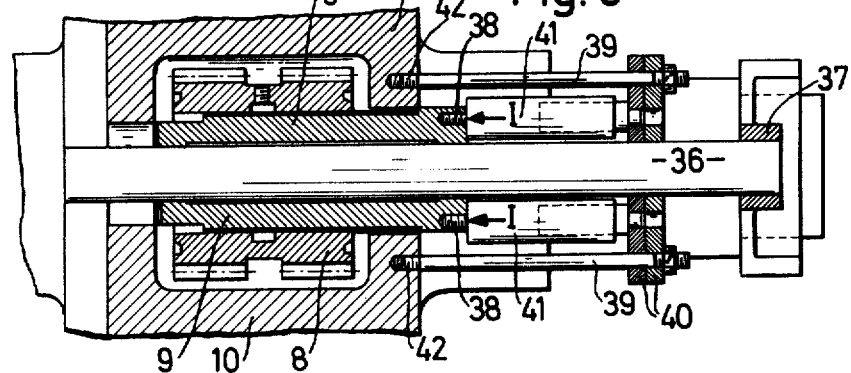
FIG. 9 shows a design view upon the gear for installing the planetary wheel bolt.

Here, according to FIG. 9 the traction bars 39 are fastened via perforations 42 to the planetary wheel carrier 10 and bear down at the mounting flange 40. Both hydraulic cylinders 41 are arranged on the one hand in the threaded holes 38 of the planetary wheel bolt 9 and on the other hand at the mounting flange 40. By exerting pressure in the direction of arrow I the bolt 9 is reassembled with the aid of the two hydraulic cylinders 41 in the planetary wheel carrier 10 in a simple manner.

Altogether, the present invention offers in a simple manner easy dismantling of the individual components of a planetary gear, so that so-called minor or major inspections can be carried out in a simple manner with reduced expenditures in time and aid means.

I claim:

1. In an improved planetary gear, particularly for use on boats comprising
   A. an outer solar wheel having two parts,
   B. an inner solar wheel, the solar wheels arranged in a housing,
   C. planetary wheels and support means therefor,
   D. inner and outer coupling sleeves at the planetary wheels,
   E. the improvement comprising access openings in
      1. the housing
      2. the wheels support means,
      3. the coupling sleeves
   said openings extending to the outer solar wheel, the planetary wheels, and the inner solar wheels,
   F. means for engaging assembly members said last means comprising recesses at
      1. the outer solar wheel
      2. the planetary wheels, and the planetary wheel support means
   the recesses at the solar wheels and the planetary wheels comprising circumferential grooves at the frontal surfaces, and
   G. each planetary wheel support means including a hollow planetary wheel bolt,
   said bolt being adapted to slidably receive a tubular support for a mounting flange for a traction device,
      1. the planetary wheel bolt including first thread bores therein for engaging members connected with the mounting flange,
      2. the planetary wheel support means including second thread bores therein outward of the wheel bolt bores for securing hydraulic cylinders supported by the mounting flange.

2. A gear according to claim 1, including a first and second elastic ring, the inner coupling sleeve being axially secured by the elastic rings to the outer coupling sleeve, the first elastic ring being constructed to be tensioned within its bearing groove by a radially displaceable wedging member.

* * * * *